United States Patent
Zubas et al.

(10) Patent No.: US 8,387,118 B2
(45) Date of Patent: Feb. 26, 2013

(54) SYSTEM AND METHOD FOR MONITORING USAGE OF A USER DEVICE

(75) Inventors: Michael Zubas, Marietta, GA (US); Mark Causey, Tucker, GA (US); Adrianne Luu, Roswell, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 277 days.

(21) Appl. No.: 12/629,259

(22) Filed: Dec. 2, 2009

(65) Prior Publication Data

US 2011/0131641 A1    Jun. 2, 2011

(51) Int. Cl.
G06F 7/04    (2006.01)
(52) U.S. Cl. .......... 726/4; 726/7; 726/1; 726/5; 726/31; 709/221; 709/224; 709/229
(58) Field of Classification Search .................. 726/7, 1, 726/4–5, 31; 709/221, 224, 229
See application file for complete search history.

(56) References Cited

U.S. PATENT DOCUMENTS

| | | |
|---|---|---|
| 2004/0048613 A1 | 3/2004 | Sayers et al. |
| 2006/0142013 A1 | 6/2006 | Sayers et al. |
| 2006/0271789 A1* | 11/2006 | Satomura et al. ............. 713/183 |
| 2007/0086437 A1 | 4/2007 | DiFazio et al. |
| 2007/0112786 A1 | 5/2007 | Shin et al. |
| 2007/0124785 A1 | 5/2007 | Marsico |
| 2008/0013524 A1 | 1/2008 | Hwang et al. |
| 2008/0076410 A1 | 3/2008 | Beyer |
| 2009/0068984 A1* | 3/2009 | Burnett ......................... 455/408 |
| 2011/0088100 A1* | 4/2011 | Rutman .......................... 726/28 |

OTHER PUBLICATIONS

.PACMAN: a platform for automated and controlled network operations and configuration management Xu Chen, Z. Morley Mao, Jacobus Van der Merwe. CoNEXT '09: Proceedings of the 5th international conference on Emerging networking experiments and technologies Dec. 2009.*
Method and System for Monitoring Usage Pattern of Resources for Optimizing Resource Utilization Jun. 4, 2010. Source: IP.com.*
"AT&T Smart Limits for Wireless," Product Information, Nov. 11, 2008, http://www.wireless.att.com/learn/articles-resources/parental-controls/smart-limits.jsp.

* cited by examiner

Primary Examiner — Thanhnga B Truong
Assistant Examiner — Angela Holmes
(74) Attorney, Agent, or Firm — Guntin & Gust, PLC; Ed Guntin

(57) ABSTRACT

A server includes a limitation database, a monitor module, and a notification module. The limitations database is configured to store control limits for a user device. The monitor module is in communication with the limitations database. The monitor module is configured to monitor usage of the user device and to determine that one of the control limits for the user device has been exceeded. The notification module is in communication with the monitor module. The notification module is configured to notify a master device that the one of the control limits for the user device has been exceeded, to receive a request to disable the user device, and to disable the user device in response to the request.

20 Claims, 3 Drawing Sheets

SYSTEM AND METHOD FOR MONITORING USAGE OF A USER DEVICE

FIELD OF THE DISCLOSURE

The present disclosure generally relates to communications networks, and more particularly relates to a system and a method for monitoring usage of a user device.

BACKGROUND

A user device can connect to different types of networks depending on the type of device and a desired communication. For example, some cellular telephones can connect to a cellular network or to a broadband network to access the Internet or to communicate with other user devices. These user devices can also have control limits set for the user device to prevent access to different types of content.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
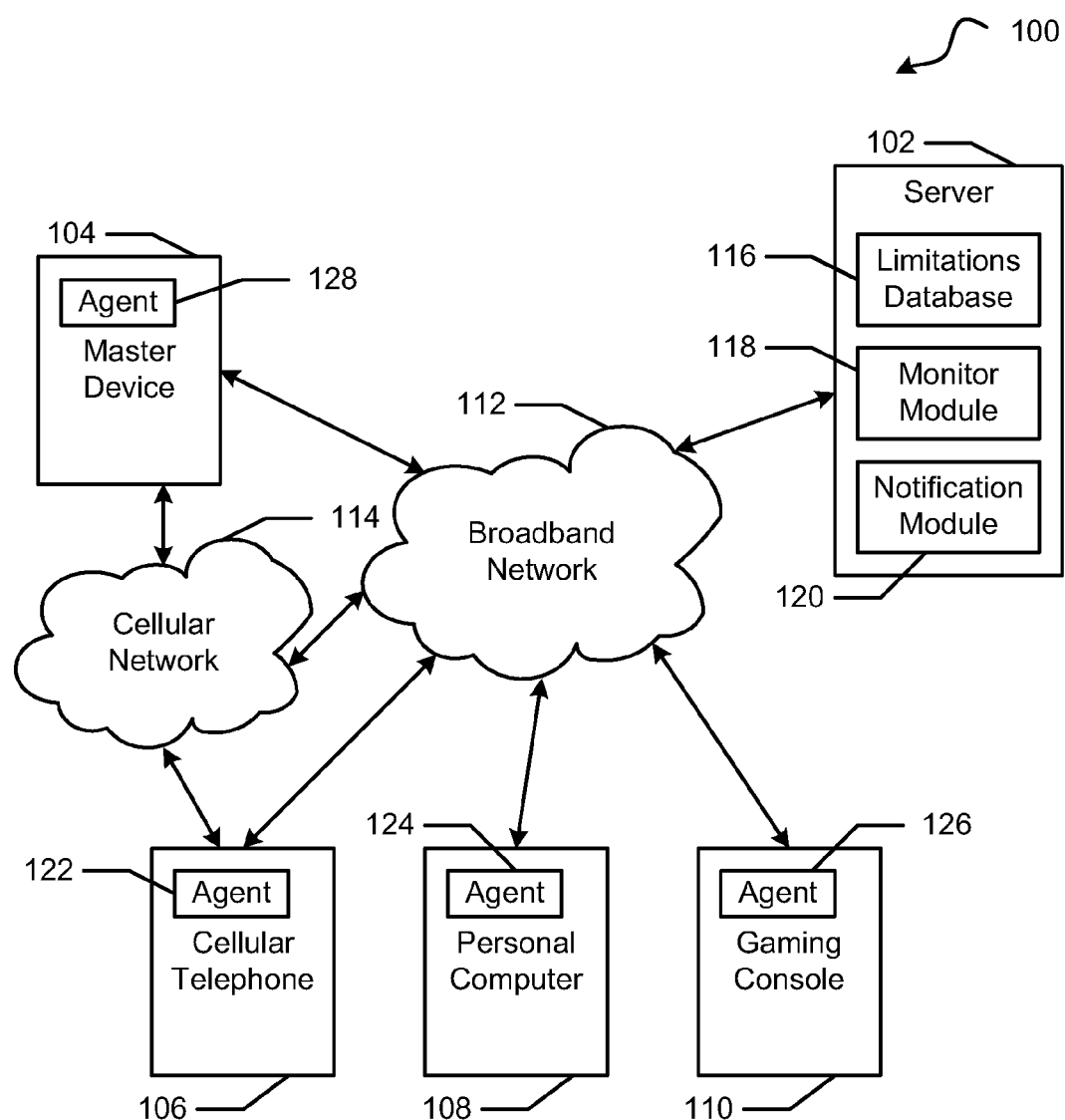
FIG. 1 is a block diagram of a communication network.

FIG. 1 shows a communication network 100 including a server 102, a master device 104, a cellular telephone 106, a personal computer 108, a gaming console 110, a broadband network 112, and a cellular network 114. The server 102 is in communication with the master device 104 and with the user devices via the broadband network 112. The server 102 can also communicate with the master device 104 and with the cellular telephone 106 via the broadband network 112 and the cellular network 114. The master device 104 is in communication with the cellular telephone 106 via the cellular network 114, or via both the broadband network 112 and the cellular network. The master device 104 is in communication with the personal communication device 108 and with the gaming console 110 via the cellular network 114 and the broadband network 112, or via only the broadband network.

The server 102 includes a limitations database 116, a monitor module 118, and a notification module 120. The master device 104 can be a cellular telephone, a personal computer, a personal digital assistant, or the like. The cellular telephone 106, the personal computer 108, and the gaming console 110 include a respective limitations agent 122, 124, or 126. The monitor module 118 and the notification module 120 can be implemented in hardware, software, or any combination thereof. Each module may include one or more computer systems. When a module includes more than one computer system, the functions of the module can be distributed across the multiple computer systems in a symmetric manner, such that each computer system performs the same type of tasks, or in an asymmetric manner, such that two computer systems of the module may perform different tasks.

The cellular telephone 106 can connect to the cellular network 114 to make telephone calls, send short message service (SMS) text messages, download applications, display websites, or the like. The cellular telephone 106 can also connect to the broadband network 112, such as a Wireless-Fidelity (WiFi) network, to download applications, display websites, or the like. The personal computer 108 can connect to the broadband network 112 to access and display different websites, play online video games, send Instant Messages to other computers, or the like. The personal computer 108 can also be used to play video games locally. The gaming console 110 can communicate with the broadband network 112 to play online video games. The gaming console 110 can also enable a user to play video games locally.

The cellular telephone 106 can have control limits set for it, such as the time of day that the user device can be used, the number of text and instant messages that can be sent or received within a specific period of time, web usage, restricted access to content, purchasing limits, blocking or allowing specific telephone numbers, or the like. Similarly, the personal computer 108 can have control limits set for it, such as the time of day that the user device can be used, restricted access to content, purchasing limits, or the like. The gaming console 110 also can have control limits set for it, such as the time of day that the user device can be used, online game usage, restricted access to online gaming websites, purchasing limits, or the like.

The control limits can be stored in the limitations agent 122, 124, or 126 of the cellular telephone 106, the personal computer 108, or the gaming console 110 and changing the control limits can be protected by a password. The control limits can also be stored individually for the cellular telephone 106, the personal computer 108, and the gaming console 110 in the limitations database 116 of the server 102. The limitations agent 122 of the cellular telephone 106 can monitor the usage of the user device to determine if the user device is attempting to access content outside of the control limits, call a restricted telephone number, or the like. The limitations agent 124 of the personal computer 108 can monitor the usage of the user device to determine if the user device is attempting to access content outside of the control limits, operate outside the allowed time of day, or the like. The limitations agent 126 of the gaming console 110 can monitor the usage of the user device to determine if the user device is attempting to access content outside of the control limits, play a restricted online game, or the like. The limitations agent 122, 124, or 126 of the cellular telephone 106, the personal computer 108, or the gaming console 110 can also monitor the password for the control limits of the user device. When the limitations agent 122, 124, or 126 detects that content outside the control limits or an incorrect password has been entered, the limitations agent can transmit a notification signal to the monitor module 118 of the server 102. The limitations agent 122, 124, or 126 can also create an event log of the usage of the cellular telephone 106, the personal computer 108, or the gaming console 110, and transmit the event log to the monitor module 118 of the server 102.

If the user of the cellular telephone 106, the personal computer 108, or the gaming console 110 enters the correct password for the control limits, the limitations agent 122, 124, or 126 can be disabled. However, the monitor module 118 can communicate with various devices within the broadband network 112 to monitor the usage of the cellular telephone 106, the personal computer 108, or the gaming console 110. The monitor module 118 can utilize the devices within the broadband network 112 and the event logs received from the limitations agent 122, 124, or 126 to determine whether the cellular telephone 106, the personal computer 108, or the gaming console 110 is accessing content or operating during a time period that is outside of the control limits stored in the limitations database 116 for the user device. When the monitor module 118 determines that the user device 106 has exceeded one of the control limits set for the user device, the notification module 120 can send the notification message to the master device 104.

Additionally, in response to the notification signal from the limitations agent 122, 124, or 126, the notification module 120 can send an incorrect password notification or a notification message to a limitations agent 128 of the master device 104. The notification message can be transmitted as a short message service (SMS) text message, an electronic mail message, a voice message, or the like. The user of the master device 104 can receive the notification message, and can utilize the limitations agent 128 of the master device to request the server 102 to perform a specific function on the user device 106. The function can be to cause the limitations agent 122, 124, or 126 of the user device 106 to lock the screen of the cellular telephone 106, the personal computer 108, or the gaming console 110, power down the user device, to disable specific communication ports on the user device, to allow telephone calls to and/or from only one telephone number, or the like.

If the server 102 causes the limitations agent 122, 124, or 126 of the cellular telephone 106, the personal computer 108, or the gaming console 110 to lock the screen of the user device, the limitations agent preferably is the only portion or component of the user device that continues to function. The limitations agent 122, 124, or 126 can wait for a reset signal from the server 102 or the master device 104. When the limitations agent 122, 124, or 126 receives the reset signal, the limitations agent can reset the cellular telephone 106, the personal computer 108, or the gaming console 110 to the operational level that the user device enjoyed before the screen lock was implemented. The operational level can include the previously set control limits and passwords.

However, if the server 102 causes the limitations agent 122, 124, or 126 to power down the cellular telephone 106, the personal computer 108, or the gaming console 110, the limitations agent preferably prevents the user device from turning on without a reset signal from the server 102. For example, when a user attempts to turn the user device on again, the limitations agent 122, 124, or 126 can communicate with the server 102 to determine whether the user device can complete the power on boot process. If the server 102 has not received the reset signal associated with the cellular telephone 106, the personal computer 108, or the gaming console 110 from the master device 104, the server 102 can notify the limitations agent 122, 124, or 126 that the user device needs to power down again. The limitations agent 122, 124, or 126 can then abort the boot process and power down the user device 106. This process can continue until the server 102 has received the reset signal from the master device 104, and the limitations agent 122, 124, or 126 can allow the cellular telephone 106, the personal computer 108, or the gaming console 110 to complete the boot process and set the control limits and passwords as previously set.

In another embodiment, the limitations agent 122, 124, or 126 of the cellular telephone 106, the personal computer 108, or the gaming console 110 can continue to disable the user device until the limitations agent communicates with the master device 104. The cellular telephone 106, the personal computer 108, or the gaming console 110 can communicate with the master device 104 via a wired connection or a wireless connection. For example, the master device 104 and the limitations agent 122 of the cellular telephone 106 can communicate via the cellular network 114, a WiFi connection, a Bluetooth connection, or the like. The limitations agent 122 can receive the reset signal from the master device 104, and can reset the cellular telephone 106 to the previous operational level. Alternatively, the personal computer 108 or the gaming console 110 can have a communication port, such as a universal serial bus (USB) port, and the limitations agent 124 or 126 can continue to disable the user device until an encryption key is received from a device plugged into the communication port. In these situations, the cellular telephone 106, the personal computer 108, or the gaming console 110 can be monitored and disabled by the server 102 and the master device 104, and the user devices can also be reset with a signal from the server, the master device, or a device having an encryption key.

Figure 2:
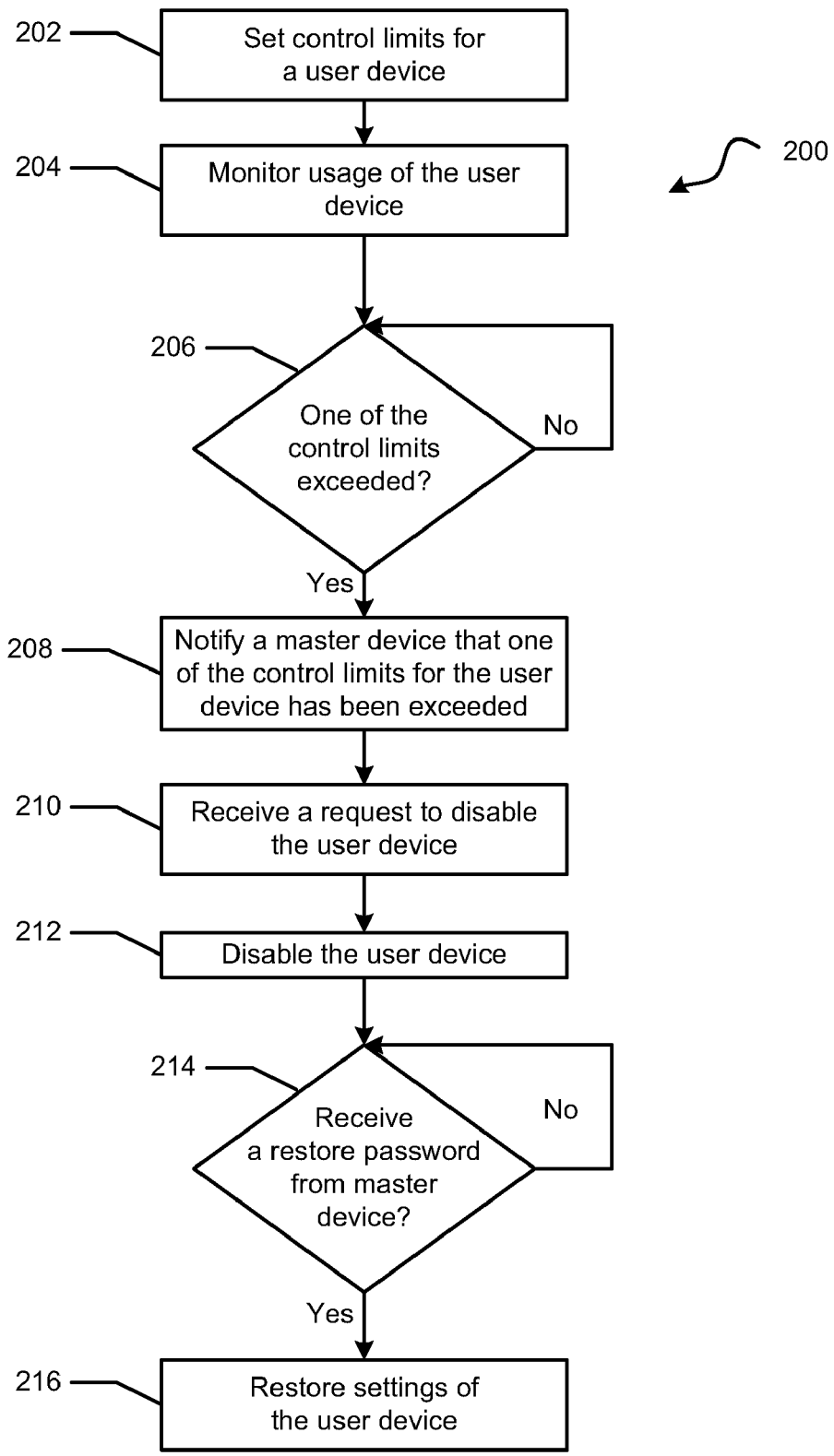
FIG. 2 is a flow diagram of a method for monitoring usage of a user device.

FIG. 2 shows a flow diagram of method 200 for monitoring usage of user devices. At block 202, control limits for a user device are set. The user device can be a cellular telephone, a personal computer, a gaming console, or the like. The control limits can include time of day that the user device can be used, number of text and instant messages that can be sent or received within a specific period of time, web usage, restricted access to content, purchasing limits, blocking or allowing specific telephone numbers, or the like. The usage of the user device is monitored at block 204. At block 206, a determination is made whether one of the control limits has been exceeded. When one of the control limits has been exceeded, a master device is notified at block 208.

At block 210, a request to disable the user device is received. Disabling the user device can include locking the screen of the user device, powering down the user device, disabling specific communication ports on the user device, or the like. The user device is disabled at block 212. At block 214, a determination is made whether a restore password has been received from the master device. When the restore password has been received, the settings of the user device are restored at block 216.

Figure 3:
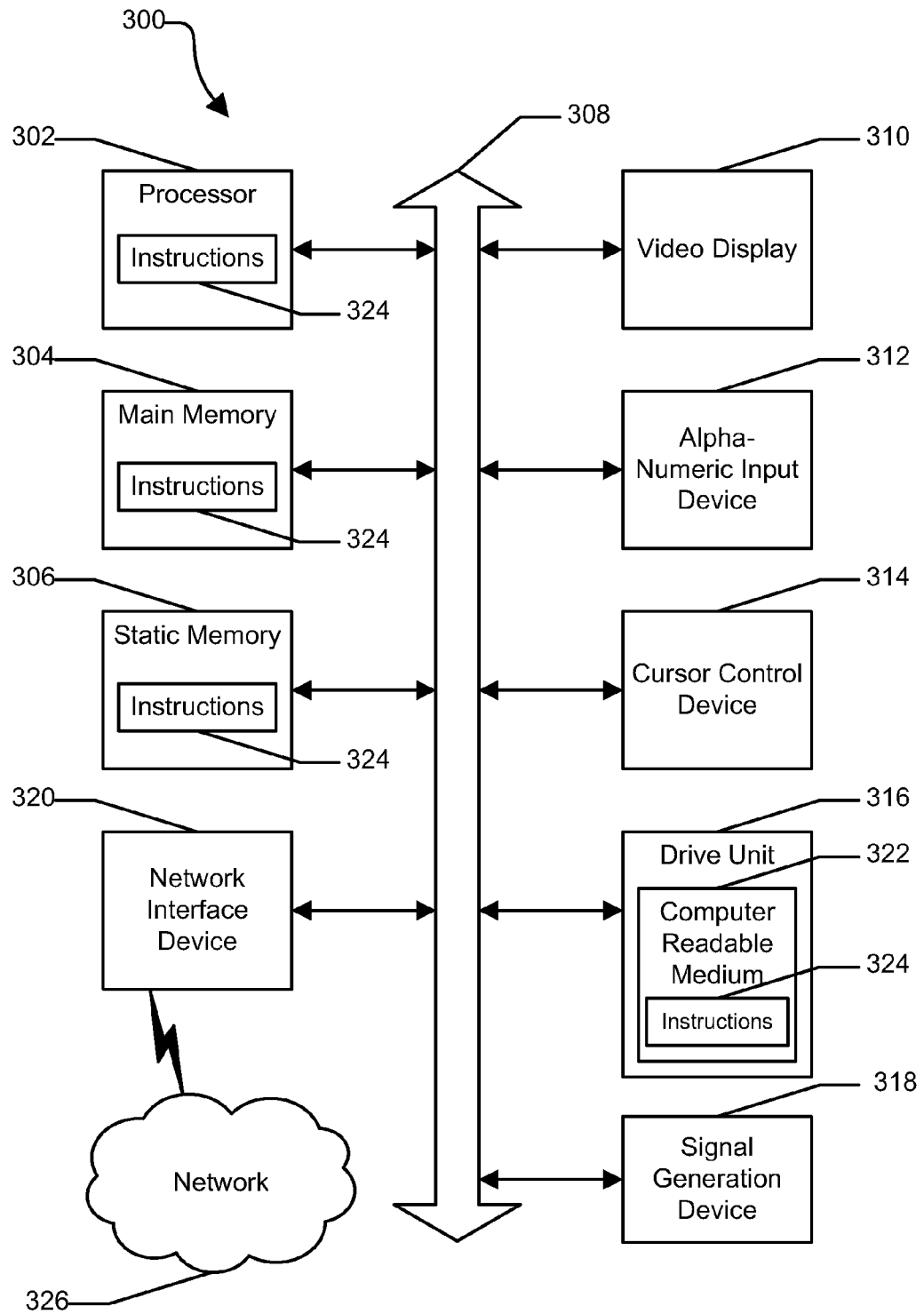
FIG. 3 is an illustrative embodiment of a general computer system.

FIG. 3 shows an illustrative embodiment of a general computer system 300. The computer system 300 can include a set of instructions that can be executed to cause the computer system to perform any one or more of the methods or computer based functions disclosed herein. The computer system 300 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

The computer system 300 may include a processor 302, such as a central processing unit (CPU), a graphics processing unit (GPU), or both. Moreover, the computer system 300 can include a main memory 304 and a static memory 306 that can communicate with each other via a bus 308. As shown, the computer system 300 may further include a video display unit 310 such as a liquid crystal display (LCD), an organic light emitting diode (OLED), a flat panel display, a solid state display, or a cathode ray tube (CRT). Additionally, the computer system 300 may include an input device 312 such as a keyboard, and a cursor control device 314 such as a mouse. The computer system 300 can also include a disk drive unit 316, a signal generation device 318 such as a speaker or remote control, and a network interface device 320 to communicate with a network 326. In a particular embodiment, the disk drive unit 316 may include a computer-readable medium 322 in which one or more sets of instructions 324, such as software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   setting, by a server comprising a processor, control limits for a user device;
   monitoring, the server, usage of the user device, wherein the monitoring includes analyzing event logs for the user device;
   determining, by the server, that one of the control limits for the user device has been exceeded;
   notifying, by the server, a master device that the one of the control limits for the user device has been exceeded;
   receiving, by the server, a first request from the master device to disable the user device;
   disabling, by the server, the user device in response to the first request by directing a software application operating in the user device to disable certain functions of the user device except for functions of the software application;
   determining, by the server, whether the user device is approved to complete a power-up sequence and to re-enable the disabled functions of the user device responsive to the server receiving a second request from the user device; and
   transmitting, by the server, to the user device an approval message to enable the user device to complete the power-up sequence and to re-enable the disabled functions responsive to determining that the server has received a reset signal from the master device.

2. The method of claim 1 further comprising:
   receiving a restore password from the master device; and
   restoring settings of the user device in response to the restore password and a confirmation that the restore password was received from the master device by directing the software application operating in the user device according to the settings.

3. The method of claim 1 further comprising:
   determining that a password for the user device has been entered incorrectly.

4. The method of claim 1 further comprising:
   determining that a password for the user device has been entered; and
   detecting that the user device is accessing content not included in the control limits.

5. The method of claim 1 wherein disabling includes locking a screen of the device, powering down the device, locking specific functions of the user device, or combinations thereof.

6. The method of claim 1 wherein the user device is selected from a group consisting of a cellular telephone, a computer, and a video game console, and wherein the control limits comprise a password to block certain content, time of day for operation, use of specific functions, or combinations thereof.

7. The method of claim 1 comprising transmitting to the user device a rejection message to cause the user device to power down and to maintain the disabled functions responsive determining that the server has not received the reset signal from the master device.

8. A method, comprising:
setting, by a server comprising a processor, control limits for a user device;
monitoring, by the server, usage of the user device, wherein the monitoring includes analyzing event logs for the user device;
determining, by the server, that a password for the user device has been entered incorrectly;
notifying, by the server, a master device that the password for the user device has been entered incorrectly;
receiving, by the server, a first request from the master device to disable the user device;
disabling by the server, the user device in response to the first request by directing a software application operating in the user device to disable certain functions of the user device except for functions of the software application;
determining, by the server, whether the user device is approved to complete a power-up sequence and to re-enable the disabled functions of the user device responsive to the server receiving a second request from the user device;
transmitting, by the server, to the user device an approval message to enable the user device to complete the power-up sequence and to re-enable the disabled functions responsive to determining that the server has received a reset signal from the master device; and
transmitting, by the server, to the user device a rejection message to cause the user device to power down and to maintain the disabled functions responsive determining that the server has not received the reset signal from the master device.

9. The method of claim 8 further comprising:
receiving a restore password from the master device; and
restoring settings of the user device in response to the restore password and a confirmation that the restore password was received from the master device by directing the software application operating in the user device according to the settings.

10. The method of claim 8 wherein disabling includes locking a screen of the device, powering down the device, locking specific functions of the user device, or combinations thereof.

11. The method of claim 8 wherein the user device is selected from a group consisting of a cellular telephone, a computer, and a video game console.

12. The method of claim 8 wherein the control limits include a password to block certain content, time of day for operation, use of specific functions, or combinations thereof.

13. A server, comprising:
a memory to store computer instructions; and
a processor coupled to the memory, wherein responsive to executing the computer instructions, the processor perform operations, comprising:
monitoring usage of a user device;
determining that one of a plurality of control limits for the user device has been exceeded;
notifying a master device that the one of the plurality of control limits for the user device has been exceeded;
receiving a first request to disable the user device;
directing a software application operating in the user device to disable certain functions of the user device except for functions of the software application;
determining whether the user device is approved to complete a power-up sequence and to re-enable the disabled functions of the user device responsive to the server receiving a second request from the user device; and
transmitting to the user device an approval message to enable the user device to complete the power-up sequence and to re-enable the disabled functions responsive to determining that the server has received a reset signal from the master device.

14. The server of claim 13 wherein responsive to executing the computer instructions the processor performs operations comprising:
receiving a restore password from the master device; and
restoring settings of the user device in response to the restore password and a confirmation that the restore password was received from the master device by directing the software application operating in the user device according to the settings.

15. The server of claim 13 wherein responsive to executing the computer instructions the processor performs operations comprising determining that a password for the user device has been entered incorrectly.

16. The server of claim 13 wherein responsive to executing the computer instructions the processor performs operations comprising:
determining that a password for the user device has been entered; and
detecting that the user device is accessing content not included in the control limits.

17. The server of claim 13 wherein monitoring includes analyzing event logs for the user device.

18. The server of claim 13 wherein disabling includes locking a screen of the device, powering down the device, locking specific functions of the user device, or combinations thereof, and wherein monitoring includes analyzing event logs for the user device.

19. The server of claim 13 wherein the user device is selected from a group consisting of a cellular telephone, a computer, and a video game console.

20. The server of claim 13 wherein the plurality of control limits comprise at least one of a password to block certain content, time of day for operation, or use of specific functions.

* * * * *